United States Patent [19]
Bergmann et al.

[11] Patent Number: 6,014,270
[45] Date of Patent: Jan. 11, 2000

[54] CYLINDRICAL LENSES FOR ALIGNMENT OF OPTICAL SOURCES AND DESTINATIONS

[75] Inventors: Ernest Eisenhardt Bergmann, Borough of Fountain Hill, Lehigh County; Sun-Yuan Huang, Maidencreek Township, Berks County, both of Pa.

[73] Assignee: Lucent Technologies Inc, Murray Hill, N.J.

[21] Appl. No.: 09/197,982

[22] Filed: Nov. 23, 1998

[51] Int. Cl.$^7$ ........................................................ G02B 3/06

[52] U.S. Cl. ........................................... 359/710; 359/813

[58] Field of Search ................................... 359/710, 668, 359/822, 813

[56] References Cited

U.S. PATENT DOCUMENTS

| | | | |
|---|---|---|---|
| 1,735,108 | 11/1929 | Cox | 359/737 |
| 3,253,525 | 5/1966 | Merkle | 350/436 |
| 3,398,918 | 8/1968 | Girault | 244/3.13 |
| 4,158,134 | 6/1979 | Martin et al. | 50/216 |
| 4,961,627 | 10/1990 | Swain et al. | 350/319 |
| 5,095,386 | 3/1992 | Scheibengraber | 359/668 |
| 5,636,059 | 6/1997 | Snyder | 359/668 |

OTHER PUBLICATIONS

"Opn Optics & Photonics News"; Nov. 1998 vol. 9, No. 11, "Two–axis Adjustable–wedge Refractive Beam Aligner" (May not be prior art, Inventor may be able to show prior conception).

Primary Examiner—Georgia Epps
Assistant Examiner—David N. Spector

[57] ABSTRACT

An apparatus is disclosed for aligning optical beams from a source to a destination. The apparatus comprises a first pair of cylindrical lenses comprised of a first cylindrical lens and a second cylindrical lens. The first and second cylindrical lenses are adapted to slide up and down or back and forth along first and second line segments. The first and second line segments can be parallel to each other. A second pair of cylindrical lenses is disclosed comprised of a third cylindrical lens and a fourth cylindrical lens. The third and fourth cylindrical lens are adapted to slide up and down or back and forth along a third and fourth line segments. The first, second, third, and fourth line segments can be parallel to each other. The first, second, third, and fourth cylindrical lenses can adapted to slide between an optical source and an optical destination. The first and second cylindrical lenses, and the third and fourth lenses respectively can be closely adjacent one another. The cylindrical lenses can be constructed in various manners including cutting out portions of original cylinders and providing index of refraction material variations. A first mirror and/or a second mirror can also be provided to provide a multiple pass through embodiment.

39 Claims, 10 Drawing Sheets

CYLINDRICAL LENSES FOR ALIGNMENT OF OPTICAL SOURCES AND DESTINATIONS

FIELD OF THE INVENTION

This invention relates to improved methods and apparatus for improving alignment of optical sources and destinations.

BACKGROUND OF THE INVENTION

Prior methods and apparatus exist for providing accurate alignment of an optical source and an optical destination. Those methods and apparatus include repositioning the optical source and/or the optical destination by remelting solder of by positioning and then epoxying or welding to a final position. Alternatively, the optical source, such as a laser diode and accompanying collimating lens may be carefully bonded to a common carrier and the common carrier may then be repositioned with more relaxed specifications. If the laser diode is positioned with a lateral control of two microns and used with a 1 millimeter focal length collimating lens, the pointing error is typically two milliradians (vertically and horizontally). This is not acceptable. Even if the pointing error of the optical source is controlled, the pointing error of the optical destination may also need to be controlled.

There is a need for a way to adjust pointing errors near an optical source and/or an optical destination without having to reposition the source and/or destination.

SUMMARY OF THE INVENTION

The present invention in some embodiments provides an apparatus comprised of a first pair of cylindrical lenses comprised of a first cylindrical lens and a second cylindrical lens. Their axes are perpendicular to one another and in our preferred embodiment, at forty-five degrees in the direction in which the lenses slide. The first pair of cylindrical lenses is used to align an optical beam from an optical source with an optical destination. "Cylindrical" lens is used in this application in a functional optical sense and does not mean that the lens looks exactly like a physical cylinder, although it may be constructed from a physical cylinder. "Cylindrical lens" as used in this application is defined as a lens made with one or more cylindrically curved surfaces. As used in this application "Cylindrical Surface" is a surface curved uniformly in one direction and without curvature in a perpendicular direction to the first direction. An example of a "cylindrical surface" is the curved surface of a can or tube or the surface formed by a gently curved or rolled sheet of paper. The "cylindrical axis" is the direction corresponding to the rotational symmetry axis of a cylinder and also corresponds to the "direction without curvature" of the cylindrical surface.

The first and second cylindrical lenses are preferably adapted to slide up and down or back and forth along first and second line segments. These up and down or back and forth directions can be thought of as the "slide" directions. The first and second line segments are preferably substantially parallel to each other. A second pair of cylindrical lenses comprised of a third cylindrical lens and a fourth cylindrical lens can also be provided wherein the third and fourth cylindrical lenses are adapted to slide up and down or back and forth along third and fourth line segments. The first, second, third, and fourth line segments are preferably substantially parallel to each other.

The first, second, third and fourth cylindrical lenses are preferably adapted to slide between an optical source and an optical destination. The light from the optical source preferably moves in a direction through the first, second, third, and fourth cylindrical lenses which is preferably transverse to the directions of sliding the lenses back and forth along the first, second, third, and fourth line segments. The first and second cylindrical lenses are preferably closely adjacent one another so that their focal properties have little axial astigmatism and the third and fourth cylindrical lenses are also preferably closely adjacent one another also to minimize axial astigmatism. The first cylindrical lens preferably has a focal length and the first and second cylindrical lenses are separated by a distance of one-twentieth of the focal length or less. Alternatively, the second cylindrical lens preferably has a focal length and the first and second cylindrical lenses are separated by a distance of one-twentieth of the focal length or less. Generally it is preferred that both lenses have the same focal lengths as each other.

The cylindrical lenses can be constructed in various ways such as from physically cylindrical surfaces or by using material variations in index of refraction.

In some embodiments, mirrors can also be provided in order to assist the cylindrical lenses in aligning an optical beam from an optical source with a destination.

DETAILED DESCRIPTION OF THE DRAWINGS

Figure 1A:
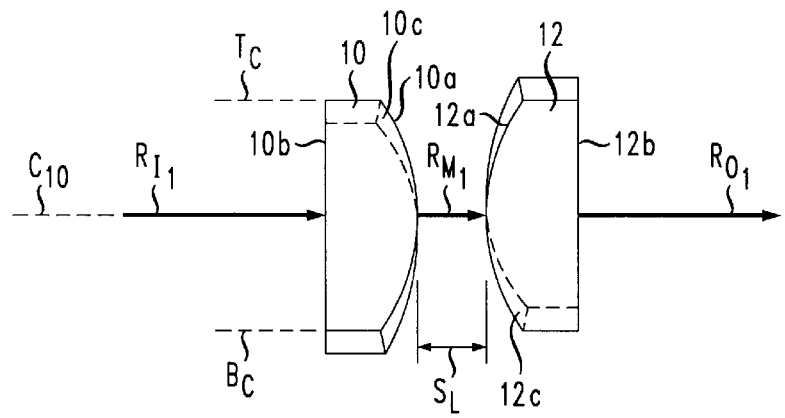
FIG. 1A shows a top view of two cylindrical lenses with an optical beam or ray going through the center of the lenses.

FIG. 1A shows a top view of cylindrical lenses 10 and 12 for use in accordance with the present invention. The lenses 10 and 12 are preferably of a type to be described. The lenses 10 and 12 have a center line $C_{10}$, which runs along an optical beam $R_{I1}$ going into lens 10 at its flat side 10b, and an optical beam $R_{M1}$ coming out of lens 10 at its contoured side 10a and going into lens 12 at its contoured side 12a and an optical beam $R_{O1}$ going out of lens 12 at its flat side 12b. The lenses 10 and 12 have hidden edges of the lens contour 10c and 12c. The lenses 10 and 12 are shown with their contoured sides 12a and 10a facing each other. Although this is the preferred arrangement, the contoured sides or curved surfaces 10a and 12a may also face away from each other or face the same direction. Lenses 10 and 12 are preferably of the same construction and are suitably rotated and flipped to provide the appropriate arrangement.

The total optical beam comprised of $R_{I1}$, $R_{M1}$ and $R_{O1}$ is not deviated by the lenses 10 and 12 and comes out of lens 12 in the same direction that it went into lens 10. This is because the total optical beam goes through the center of the lenses 10 and 12. The centered top position of the lenses 10 and 12 is $T_c$ and the centered bottom position of the lenses 10 and 12 is $B_c$. The space between the lenses 10 and 12 kept small to reduce axial astigmatism.

Figure 1B:
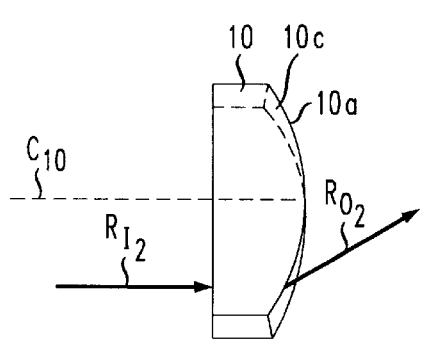
FIG. 1B shows a top view of a cylindrical lens of a first type with an optical beam going through a location below the center of the lens.

FIG. 1B shows the lens 10 by itself when it is moved upwards so that the center $C_{10}$ of the lens 10 is above an input optical beam $R_{I2}$. Because of the contoured surface 10a of the cylindrical lens 10 the input optical beam $R_{I2}$ is deviated and comes out as optical beam $R_{O2}$. Thus when the lens 10 is moved upwards it causes the direction of the optical beam $R_{O2}$ to move upwards. Moving the lens 10 upwards also causes the direction of the optical beam $R_{O2}$ to move inwards, into the page as the cylindrical surface normal is out of the page at bottom.

Figure 1C:
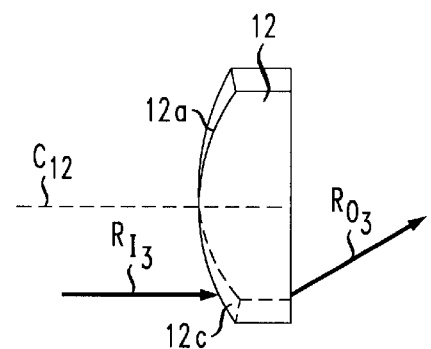
FIG. 1C shows a top view of a cylindrical lens of a second type with an optical beam going through a location below the center of the lens.

FIG. 1C shows the lens 12 by itself when it is moved upwards so that the center $C_{12}$ of the lens 12 is above an input optical beam $R_{I3}$. Because of the contoured surface 12a of the cylindrical lens 12 the input optical beam $R_{I3}$ is deviated and comes out as optical beam $R_{O3}$. Thus when the lens 12 is moved upwards it causes the direction of the optical beam $R_{O3}$ to move upwards. Moving the lens 12 upwards also causes the direction of the optical beam $R_{O3}$ to move outwards, out of the page.

Figure 1D:
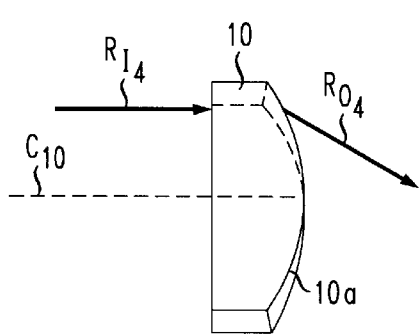
FIG. 1D shows a top view of a cylindrical lens of a first type with an optical beam going through a location above the center of the lens.

FIG. 1D shows the lens 10 by itself when it is moved downwards so that the center $C_{10}$ of the lens 10 is below an input optical beam $R_{I4}$. Because of the contoured surface 10a of the cylindrical lens 10 the input optical beam $R_{I4}$ is deviated and comes out as optical beam $R_{O4}$. Thus when the lens 10 is moved downwards it causes the direction of the optical beam $R_{O4}$ to move downwards. Moving the lens 10 downwards also causes the direction of the optical beam $R_{O4}$ to move outwards, out of the page.

Figure 1E:
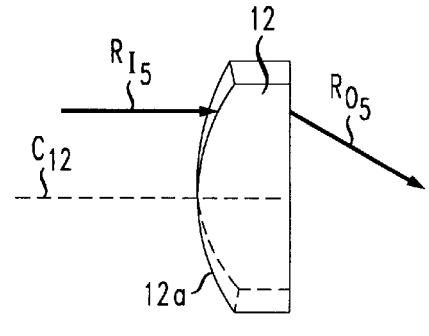
FIG. 1E shows a top view of a cylindrical lens of a second type with an optical beam going through a location above the center of the lens.

FIG. 1E shows the lens 12 by itself when it is moved downwards so that the center $C_{12}$ of the lens 12 is below an input optical beam $R_{I5}$. Because of the contoured surface 12a of the cylindrical lens 12 the input optical beam $R_{I5}$, is deviated and comes out as optical beam $R_{O5}$. Thus when the lens 12 is moved downwards it causes the direction of the optical beam $R_{O5}$ to move downwards. Moving the lens 12 downwards also causes the direction of the optical beam $R_{O5}$ to move inwards, into the page.

The following table is a summary of the impact of motion of the combination of lenses 10 and/or 12 on deviation of an optical beam from input at lens surface 10b to output at lens surface 12b assuming the lenses 10 or 12 move one unit up or down.

| Lens 10 Movement Direction (Up or down 1 unit) | Lens 12 Movement Direction (Up or down 1 unit) | Deviation Direction of Output Optical Beam |
|---|---|---|
| Up | Up | Upward |
| Up | Down | Inward |
| Down | Up | Outward |
| Down | Down | Downward |

Thus by sliding both lenses 10 and 12 up or down, the output optical beam can be redirected both parallel and perpendicular to the plane of the page, which provides two dimensional control.

Figure 1F:
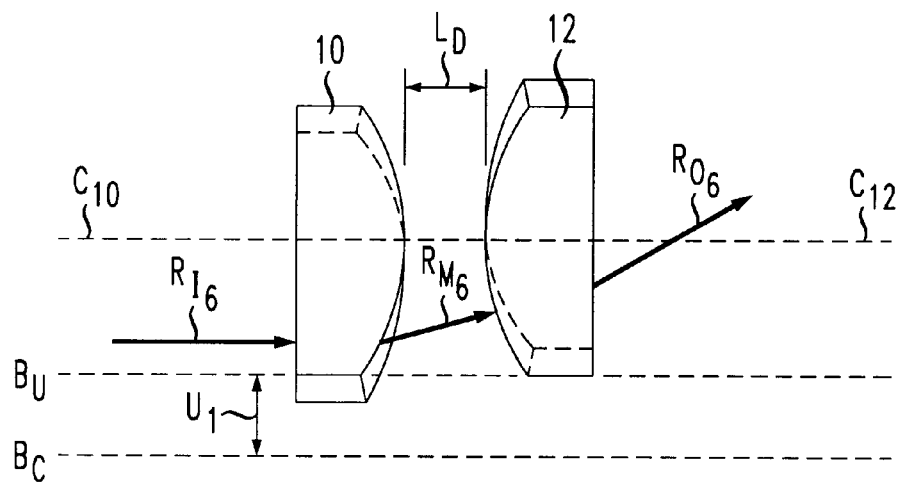
FIG. 1F shows a top view of the two cylindrical lenses of FIG. 1A moved upwards so that an optical beam passes a location below the centers of the lenses.

In FIG. 1F, the lenses 10 and 12 are moved upwards by the distance $U_1$, from their bottom center position $B_c$ to their bottom upper position $B_u$. The center lines $C_{10}$ and $C_{12}$ lie above the input optical beam $R_{I6}$. The input optical beam $R_{I6}$ is deviated upwards and comes out of lens 10 as optical beam $R_{M6}$. The optical beam $R_{M6}$ is deviated upwards by lens 12 and comes out as optical beam $R_{O6}$. The distance between the lenses 10 and 12, $L_D$ should preferably be as small as practicable. The optical beam $R_{O6}$ is not deviated in direction inwards nor outwards from the initial beam $R_{I6}$, since the effects of lenses 10 and 12 cancel each other in that respect. The focal length of the lenses 10 and 12 is relatively large so that large displacements produce small adjustments to the beam direction. Using a weak set of lenses, i.e. having long focal lengths, for lenses 10 and 12, requires using only a slight modification of the other optics in the system to compensate the focal change.

Figure 1G:
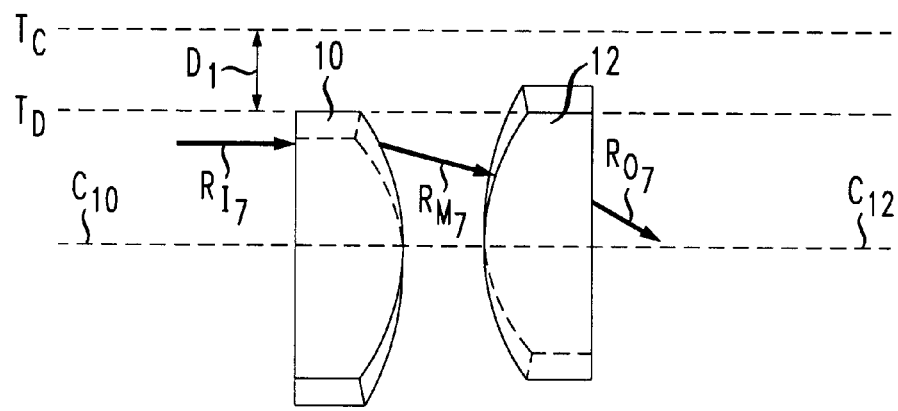
FIG. 1G shows a top view of the two cylindrical lenses of FIG. 1A moved downwards so that an optical beam passes a location above the centers of the lenses.

In FIG. 1G, the lenses 10 and 12 are moved downwards by the distance $D_1$, from their top center position $T_c$ to their top downward position $T_d$. The center lines $C_{10}$ and $C_{12}$ lie below the input optical beam $R_{I7}$. The input optical beam $R_{I7}$ is deviated downwards and comes out of lens 10 as optical beam $R_{M7}$. The optical beam $R_{M7}$ is deviated downwards by lens 12 and comes out as optical beam $R_{O7}$. The optical beam $R_{O7}$ is not deviated inwards or outwards in direction from the initial beam $R_{O7}$, since the effects of lenses 10 and 12 cancel each other in that respect.

Figure 1H:
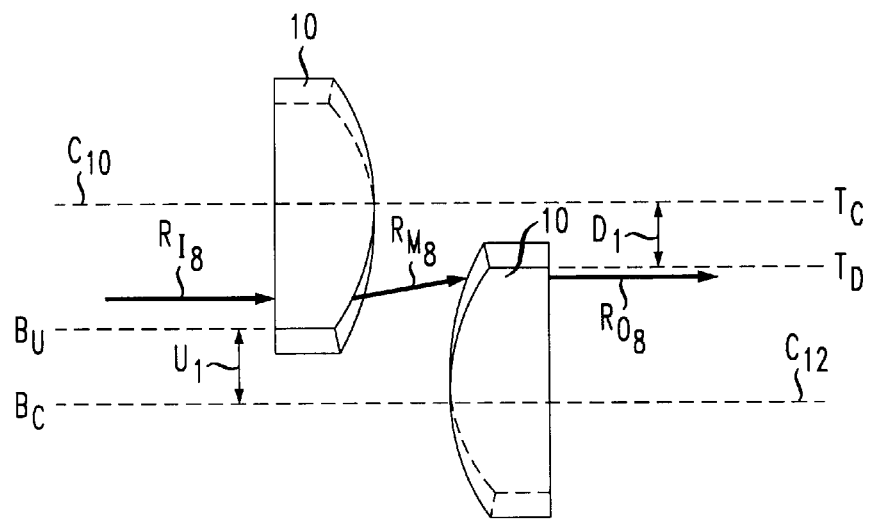
FIG. 1H shows a top view of the two cylindrical lenses of FIG. 1A, wherein the lens of the first type is moved upwards and the lens of the second type is moved downwards.

In FIG. 1H, the lens 10 is moved upwards by the distance $U_1$, from its bottom center position $B_c$ to its bottom upper position $B_u$. The center line $C_{10}$ lies above the input optical beam $R_{I8}$. The input optical beam $R_{I8}$ is deviated upwards and inwards and comes out of lens 10 as optical beam $R_{M8}$. In FIG. 1H, the lens 12 is moved downwards by the distance $D_1$, from its top center position $T_c$ to its top downward position $T_d$. The center line $C_{12}$ lies below the intermediate optical beam $R_{M8}$. The intermediate optical beam $R_{M8}$ is deviated downwards and inwards by lens 12 and comes out as optical beam $R_{O8}$. The optical beam $R_{O8}$ is deviated inwards from the optical beam $R_{I8}$. In this example the distances $U_1$ and $D_1$ are equal and the lenses 10 and 12 are of equal strength as well. It is preferred that the lenses 10 and 12 be of equal strength, otherwise one will experience an astigmatism from the lens pair. $R_{O8}$ is altogether not deviated in direction either up or down the page.

Figure 1I:
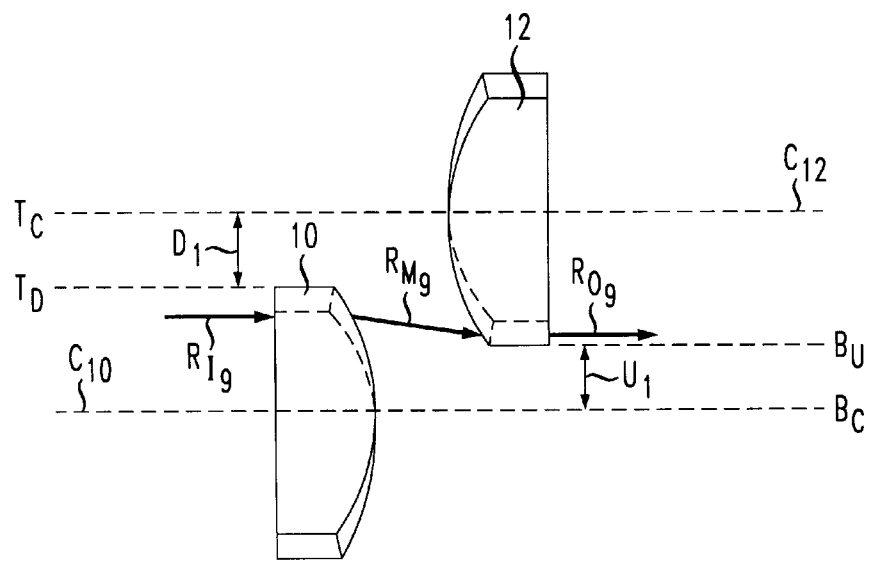
FIG. 1I shows a top view of the two cylindrical lenses of FIG. 1A, wherein the lens of the first type is moved downwards and the lens of the second type is moved upwards.

In FIG. 1I, the lens 10 is moved downwards by the distance $D_1$, from its top center position $T_c$ to its top downward position $T_d$. The center line $C_{10}$ lies below the input optical beam $R_{I9}$. The input optical beam $R_{I9}$ is deviated downwards and outwards by lens 10 and comes out as optical beam $R_{M9}$. The lens 12 is moved upwards by the distance $U_1$, from its bottom center position $B_c$ to its bottom upper position $B_u$. The center line $C_{12}$ lies above the intermediate input optical beam $R_{M9}$. The intermediate optical beam $R_{M9}$ is deviated upwards and outwards and comes out of lens 12 as optical beam $R_{O9}$. In this example the distances $U_1$ and $D_1$ are equal. The optical beam $R_{O9}$ is deviated outwards from the optical beam $R_{I9}$. $R_{O9}$ is neither deviated up or down the page.

Figure 2:
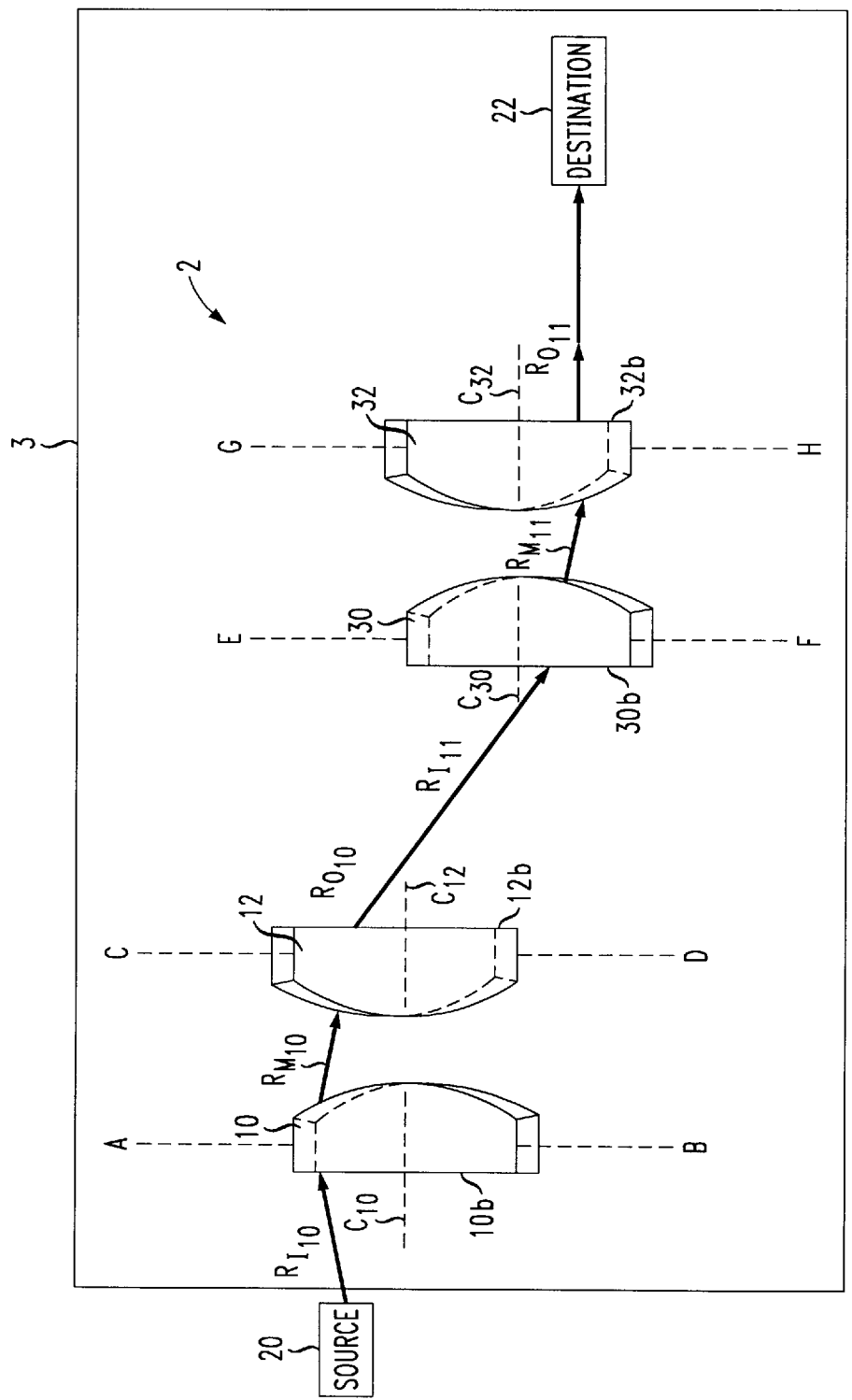
FIG. 2 shows a top view of two pairs of cylindrical lenses which can be slid up and down or back and forth in accordance with the present invention to align an optical source with an optical destination.

FIG. 2 shows a top view of an apparatus 2 in accordance with an embodiment of the present invention. The apparatus 2 includes a first pair of cylindrical lenses 10 and 12 and a second pair of cylindrical lenses 30 and 32. A optical source 20 and an optical destination 22 also are shown. The cylindrical lenses 10, 12, 30, and 32 are adapted so that they can move up and down or back and forth along line segments AB, CD, EF, and GH respectively. Flat surfaces 10b, 12b, 30b, and 32b preferably are parallel to the line segments AB, CD, EF, and GH, respectively. Various apparatus can be provided for allowing the cylindrical lenses 10, 12, 30, and 32 to slide up and down or back and forth. For example lenses 10, 12, 30 and 32 may be translationally mounted to a platform 3 shown in FIG. 2. The lenses 10, 12, 30, and 32 may be mounted so that they can slide up and down or back and forth similar to slidable volume level and balance switches on a stereo. When optical alignment is achieved, some or all of these lenses 10, 12, 30, and 32 may be permanently fixed or bonded to platform 3.

The source 20 emits an optical beam or ray $R_{I10}$ the optical beam $R_{I10}$ passes through the cylindrical lens 10 above the center line $C_{10}$ and thus is deviated downwards and outwards and comes out as optical beam $R_{M10}$. The optical beam $R_{M10}$ is deviated downwards and inwards and comes out as optical beam $R_{O10}$. The optical beam $R_{O10}$ is input to lens 30 as optical beam $R_{I11}$. The optical beam $R_{I11}$ is deviated upwards and inwards and comes out as intermediate beam $R_{M11}$. The intermediate beam $R_{M11}$ is input to lens 32 and is deviated upwards and outwards and comes out as output beam $R_{O11}$ which is sent to destination 22. In this manner the optical source 20 is aligned with the optical destination 22. If the optical source 20 becomes misaligned with the optical destination 22 then the lenses 10, 12, 30, and 32 can be moved upwards or downwards as the case may be along the lines AB, CD, EF, and GH respectively thus providing four degrees of adjustment or control. The lenses 10, 12, 30, and 32 as shown in FIG. 2, preferably are adaptable to slide along their line segments AB, CD, EF, and GH between the source 20 and the destination 22. Light from the source 20 preferably enters and passes through the lenses 10, 12, 30, and 32, transverse to the directions of sliding the lenses along the above line segments. Using these four motions, one can adjust the positioning of $R_{O11}$ laterally (2 directions) and tilt (2 directions) a total of four degrees of freedom.

Figure 3:
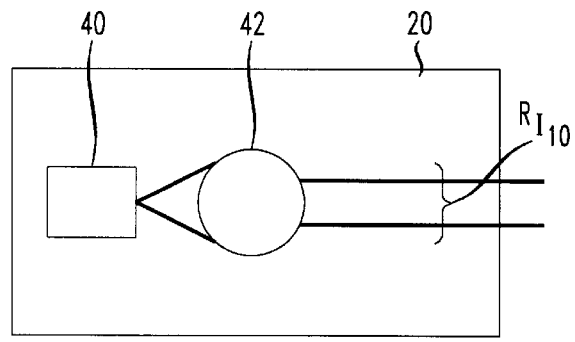
FIG. 3 shows a top view of an optical source for use in FIG. 2.

FIG. 3 shows a top view of the optical source 20 for use in FIG. 2. Alternative optical sources to optical source 20 are possible. The optical source 20 includes laser chip 40 and ball lens 42. The optical beam $R_{I10}$ is shown emitted from ball lens 42. (The optical beam $R_{I10}$ is shown as a single line in other Figures. for convenience). Other optical sources such as a light from a fiber end, refocussed by a lens are possible instead of optical source 20.

Figure 4A:
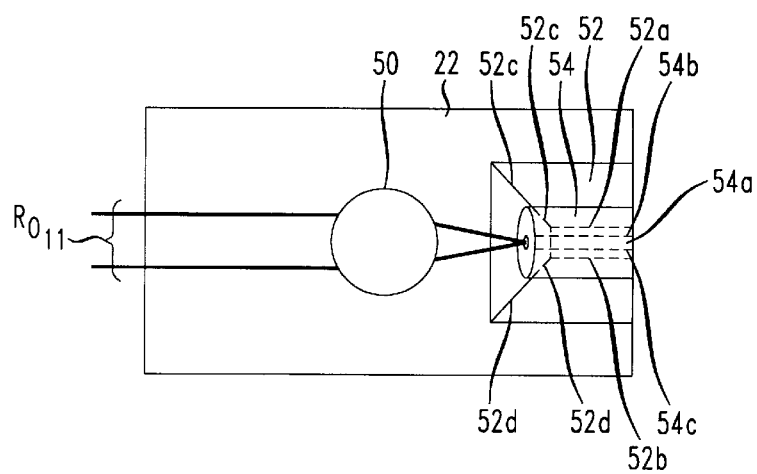
FIG. 4A shows a top view of an optical destination for use in FIG. 2.
Figure 4B:
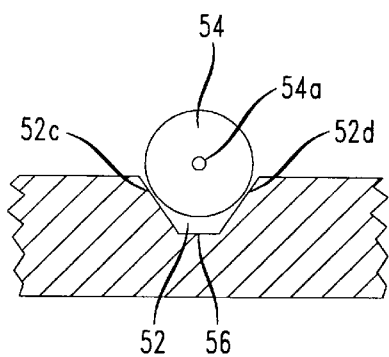
FIG. 4B shows an end view of a V-groove and an optical fiber.
Figure 4C:
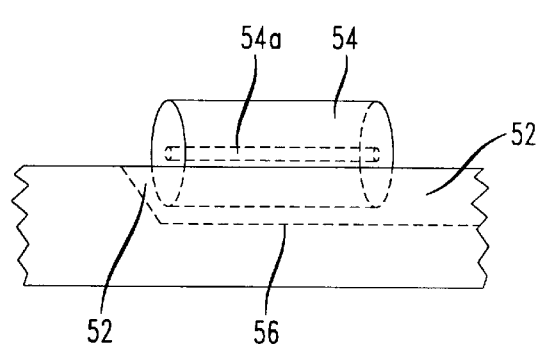
FIG. 4C shows a side view of an optical fiber in a V-groove.

FIG. 4A shows a top view of the optical destination 22 for use in FIG. 2. The optical destination includes ball lens 50 and an optical fiber 54 which is positioned in V-groove 52. The optical fiber 54 has a central axis 54a which is defined by dashed lines 54c and 54b as shown in FIG. 4A. The V-groove 52 includes sides 52c and 52d both of which have solid line and dashed line portions. The V-groove also includes sides 52a and 52b shown in FIG. 4A. FIG. 4B shows an end view of the V-groove 52 and the optical fiber 54. FIG. 4C shows a side view of the optical fiber 54 in the V-groove 52. The V-groove 52 is preferably part of a silicon substrate. 56 indicates (an optional) floor to the V-groove 52 in FIGS. 4B and 4C. The V-groove 52 sides 52c and 52d could also converge to a common edge.

V-groove 52 may be formed in a manner known in the art. The optical beam $R_{O11}$ is input to ball lens 50. (The optical beam $R_{O11}$ is shown as a single line in other figures for convenience).

Figure 5A:
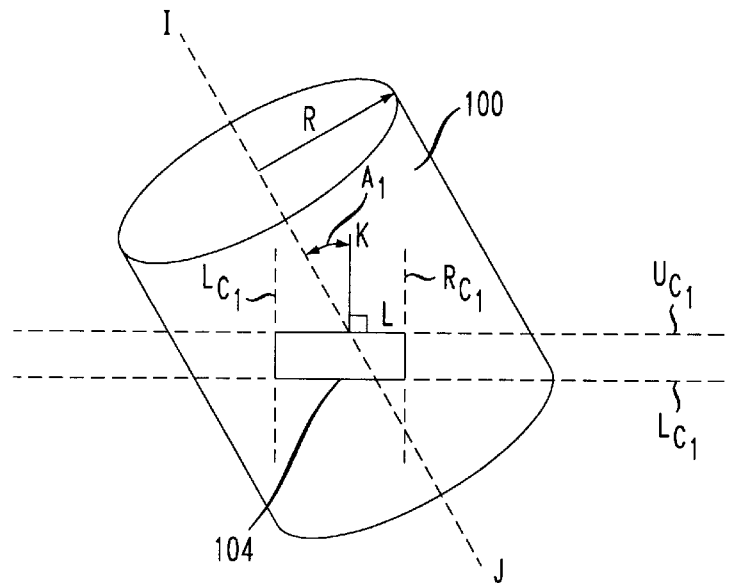
FIG. 5A shows a perspective view of an original cylinder for use in forming a cylindrical lens in accordance with the present invention.
Figure 9:
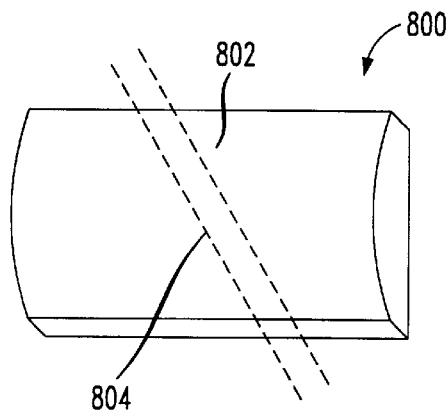
FIG. 9 shows a cylindrical lens slab and a method for preparing an appropriate angle for a cylindrical lens.

FIG. 5A shows a perspective view of an original cylinder 100, which is preferably made of a suitable transparent material, for use in forming a cylindrical lens 104 in accordance with the present invention. The original cylinder 100 has a cylindrical axis IJ which is tilted by an angle $A_1$, preferably 45 degrees, from a line segment KL. The cylindrical lens 104 is a cutout of the original cylinder 100 taken perpendicularly to the line segment KL. The purpose of this tilting is so that the pair of adjacent lenses (such as lenses 10 and 12) have their cylindrical axes at 90 degrees with respect to one another and that neither lens has its cylindrical axis parallel to the direction of sliding motion. The cylindrical lens 104 can be cut-out by making upper cut along line $U_{C1}$, which is preferably perpendicular to line segment KL, a lower cut along line $L_{C1}$ which is also preferably perpendicular to line segment KL, and a left cut $L_{C1}$ and a right cut $R_{C1}$ which are preferably parallel to line segment KL. These four cuts result in an intermediate block comprised of discard section 105 and cylindrical lens 104 shown in FIG. 5C. The discard section 105 can be separated from the cylindrical lens 104 by a cut $C_L$ which eliminates the contour 105c, and much of the thickness so that a single contour 104c is left. The actual manufacture of large cylindrical lenses does not usually start with a complete cylinder. We have started with a cylinder for illustrative purposes only. Commercially available shapes such as shown in FIG. 9 are a more convenient starting point.

Figure 5B:
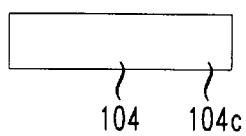
FIG. 5B shows a front view of the cylindrical lens of FIG. 5A.
Figure 5C:
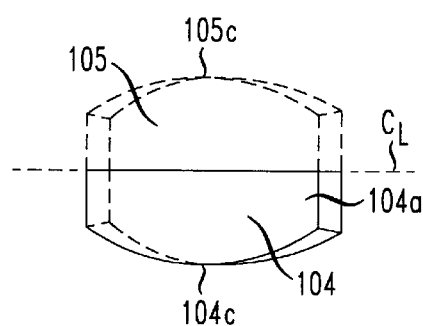
FIG. 5C shows a top view of the cylindrical lens of FIG. 5A and the part of an intermediate section that is cut off.
Figure 5D:
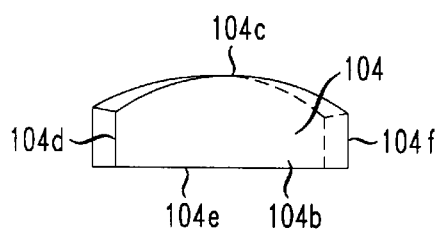
FIG. 5D shows a bottom view of the cylindrical lens of FIG. 5A.
Figure 5E:
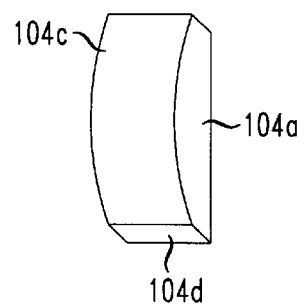
FIG. 5E shows a perspective view of the cylindrical lens of FIG. 5A.

The cylindrical lens 104 has a contoured side 104c and a flat side 104e as shown in FIGS. 5C and 5D. Optionally, the cylindrical lens 104 also has a side 104d, and a side 104f. Lens 104 has a long side 104a and a long side 104b. A front view and a perspective view of the cylindrical lens 104 are shown in FIG. 5B and FIG. 5E, respectively. Note that in this example, the cylindrical lens 104 is not actually a physical cylinder but rather a cutout from a cylinder. Typically the lens 104 will rest on one of its long sides (either long side 104a or 104b) and slide along that same side.

The cylindrical lens 104 can be used for the lenses 10 and 30 of the embodiment of FIG. 2. Lenses 12 and 32 can be formed in the same manner as lenses 10 and 30 except that lenses 12 and 32 are lenses 10 and 30, respectively, turned over. This means that lens 10 could be made in the manner of cylindrical lens 104 and made to rest on long side 104a, and then lens 12 would be made in the manner of cylindrical lens 104 and made to rest on the other long side, long side 104b. This is also true for lenses 12 and 32.

Figure 6:
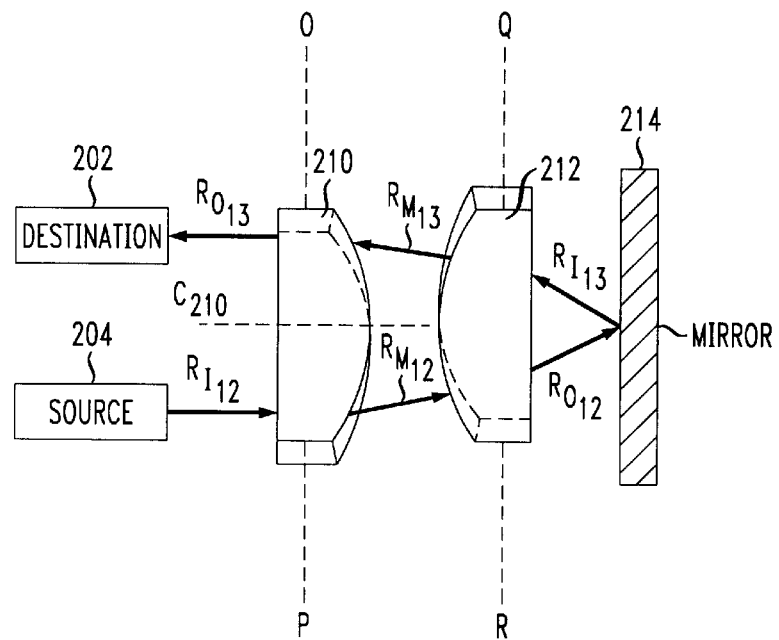
FIG. 6 shows an embodiment of the present invention where one pair of cylindrical lenses is used twice and a mirror is used.

FIG. 6 shows an embodiment of the present invention where one pair of cylindrical lenses, 210 and 212 are used twice, and a mirror 214 is used once. An optical beam $R_{I12}$ is emitted from a source 204, passes through a lens 210, below the center line $C_{210}$. The optical beam $R_{I12}$ is deviated upwards and inwards by lens 210 to form intermediate optical beam $R_{12}$, then deviated upwards and outwards by lens 212 to form optical beam $R_{O12}$. Lens 210 is preferably a cylindrical lens cutout, such as cylindrical lens 104 shown in FIG. 5A–5E and lens 212 can be the same type of lens.

The optical beam $R_{O12}$ reflects off of mirror 214 to form optical beam $R_{I13}$ which is input to cylindrical lens 212. The optical beam $R_{I13}$ is deviated downwards and inwards by lens 212 to form optical beam $R_{M13}$, which is further deviated downwards and outwards by lens 210 to form optical beam $R_{O13}$ which is input to the optical destination 202. The lenses 210 and 212 can be slid up and down or back and forth along lines OP and QR, respectively, in order to align the destination 202 with the source 204 should they become misaligned. Thus two degrees of adjustment are provided to align for two degrees of freedom, such as the x and y position of the destination 202.

Figure 7:
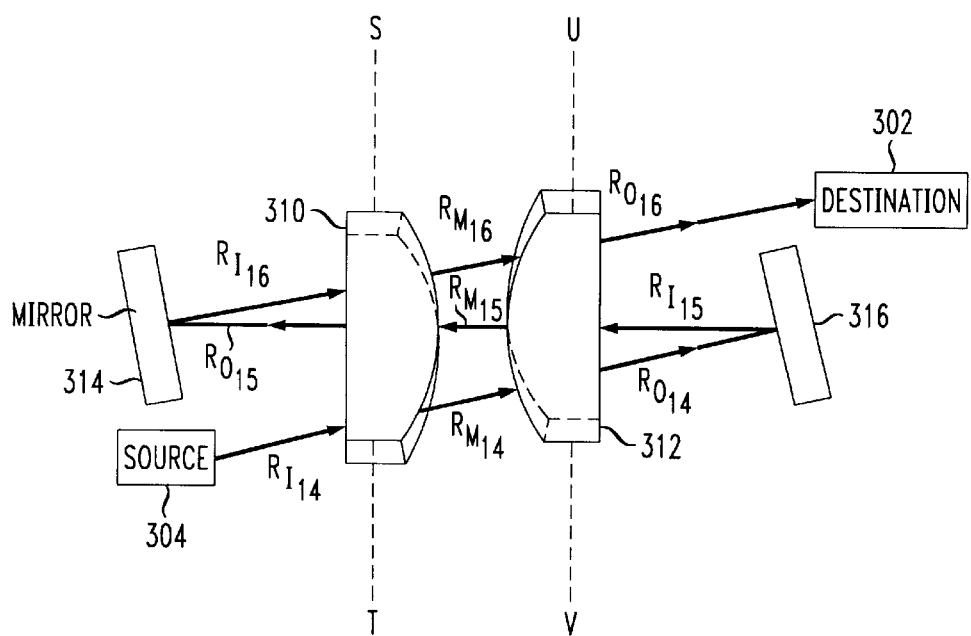
FIG. 7 shows an embodiment of the present invention where one pair of lenses are used three times and two mirrors are used.

FIG. 7 shows an embodiment of the present invention where one pair of lenses, including lens 310 and 312 are used, three times, and mirrors 314 and 316 are each used once. Lenses 310 and 312 are preferably of the type used for lenses 10 and 12, respectively, of FIG. 2. Generally speaking, an optical beam $R_{I14}$ is output from an optical source 304 and is deviated by lens 310 to form optical beam $R_{M14}$, which is deviated by lens 312 to form optical beam $R_{O14}$ which reflects off of mirror 316 to form optical beam $R_{I15}$. The optical beam $R_{I15}$ is deviated by lens 312 to form optical beam $R_{M15}$ which is deviated by lens 310 to form optical beam $R_{O15}$ which reflects off of mirror 314 to form optical beam $R_{I16}$. The optical beam $R_{I16}$ is deviated by lens 310 to form optical beam $R_{M16}$ which is deviated by lens 312 to form optical beam $R_{O16}$. The optical beam $R_{O16}$ is sent to optical destination 302. The lenses 310 and 312 can be moved along the lines ST and UV, respectively, in order to align with two degrees of adjustment the source 304 and destination 302 should they become misaligned. Strictly speaking mirror 314 should be tilted slightly upwards towards the direction of optical beam $R_{I16}$ and mirror 316 should be tilted downwards towards the direction of optical beam $R_{O14}$. Also strictly speaking there would be some deviations of beam directions when travelling through lenses 310 and 312.

FIGS. 8A–D show cylindrical lenses 400, 500, 600, and 700, respectively, which are made "cylindrical" by variations in material index of refraction as opposed to surface variations. It is understood that the "axis" of the lens (such as one of lenses 400, 500, 600, and 700) will still preferably be 45 degrees with respect to the slide direction.

Figure 8A:
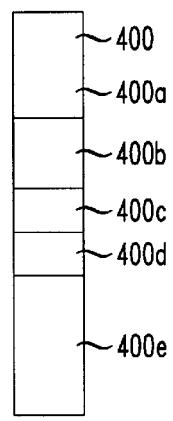
FIGS. 8A–D show cylindrical lenses which are constructed by material variations in index of refraction.

In FIG. 8A, cylindrical lens 400 is comprised of regions 400a–400e. The regions are ordered to produce a "positive" cylindrical lens. The regions 400a and 400e have low indexes of refraction, the regions 400b and 400d have intermediate indexes of refraction, and the region 400c has a high index of refraction. The regions 400a–400e may actually blur together as a continuum. This means the index of refraction may gradually increase from region 400a to a maximum in region 400c and then gradually decrease towards region 400e. The lens 400 preferably can be used in place of the first lenses 10 or 30 of FIG. 2.

Figure 8B:
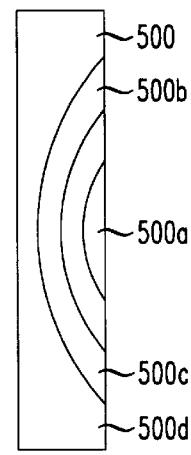

The lens 500 in FIG. 8B is comprised of regions 500a–500d. The region 500a has the highest index of refraction, the region 500b is the next highest, the region 500c is the next highest, and the region 500d has the lowest index of refraction. The indexes of refraction may again change gradually from the region 500a to 500d. The lens 500 can be used as the second lens 12 or 32 of FIG. 2 and a second lens 500 can used as the first lens 10 or 30. However, a preferred way to get "matched" lenses, i.e. lenses of equal strength is to use a pair made or cut from the same original lens or lens slab such as lens slab 800 of FIG. 9.

Figure 8C:
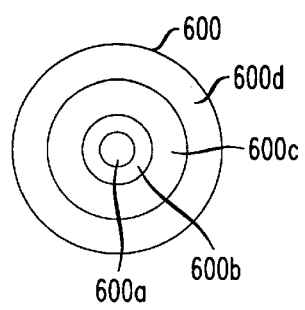

The structure 600 shown in FIG. 8C is the end face of a possible gradient index lens. It can be sliced (as a log in a saw mill) to form FIG. 8A and FIG. 8B. The structure 600 includes regions 600a–600d. Region 600a would have the highest index of refraction, 600b next highest, 600c next highest, and 600d the lowest. Again the index of refraction may change gradually. Such cylindrical structures are sold commercially as GRIN lenses, when used end-on (in and out of paper), it acts approximately like a spherical lens.

Figure 8D:
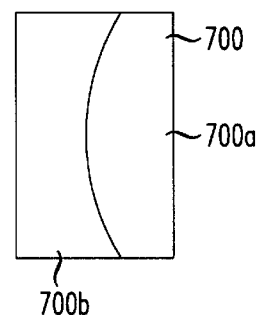

In FIG. 8D, the lens 700 is comprised of regions 700a and 700b. Region 700a has a higher index of refraction.

Figure 8E:
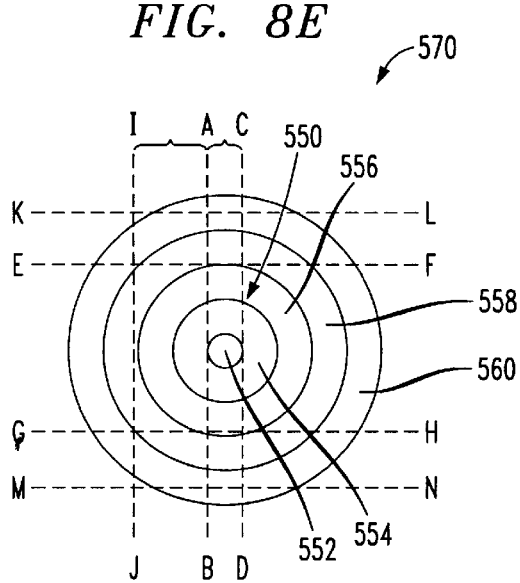
FIG. 8E shows how structures similar to that shown in FIGS. 8A and 8B can be constructed from a structure similar to that shown in FIG. 8C.

FIG. 8E shows how structures similar to that shown in FIGS. 8A and 8B can be constructed from a structure similar to that shown in FIG. 8C. FIG. 8E shows an overall lens structure 570 from which the lens structures 550 and 650 can be cut out. Lens structure 570 includes layers 552, 554, 556, 558, and 560. Layer 552 would have the highest index of refraction with the next layers having increasing lower indices of refraction. A lens structure 550 corresponding roughly to the lens 400 of FIG. 8A, can be cut out by cutting along lines AB, CD, EF, and GH from the overall lens structure 570. A lens structure 650 roughly corresponding to the lens 500 can be cut out by cutting along lines KL, MN, IJ and AB from the overall lens structure 570.

FIG. 9 shows a cylindrical lens slab 800 and a method for preparing an appropriate 45 degree angled cylindrical lens. Saw cuts 802 and 804 are employed and possibly many more cuts can be employed for more lenses. Similarly, designs like those is FIGS. 8A, 8B, and 8D, and the sections cut from FIG. 8E could be used for 800 and cut as shown in FIG. 9.

Figure 10A:
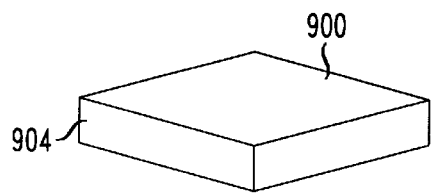
FIGS. 10A–C show a method of doping a cylindrical lens slab to give varying indexes of refraction.
Figure 10B:
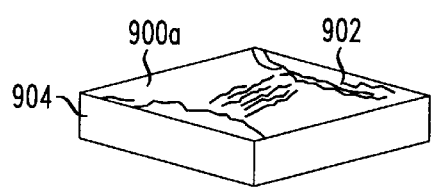
Figure 10C:
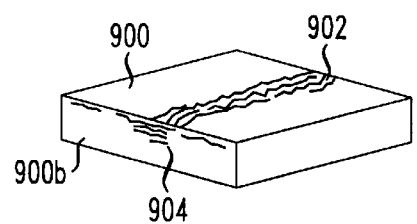

FIGS. 10A–C show a method of doping a cylindrical lens slab 900 to give different indexes of refraction. The slab 900 is shown without doping in FIG. 10A. In FIG. 10B, a dopant 902 is shown placed on the surface 900a of the slab 900. The areas on the surface 900a correspond to areas where greater amounts of dopant 902 are being diffused. The dopant 902 in FIG. 10B to be diffused is located in greater concentrations along the area of the intended cylindrical axis as shown by the darker shading and in less concentrations further away from the intended cylindrical axis as shown by the lighter shading or non-existent shading. In FIG. 10C the dopant 904 is shown diffused into the body 900*b* of the slab 900. After diffusion, the index near the middle (nearest intended axis) has the most changed index of refraction, as shown by the shading on the body 900*b* compared to the index of refraction of the original material.

Figure 11A:
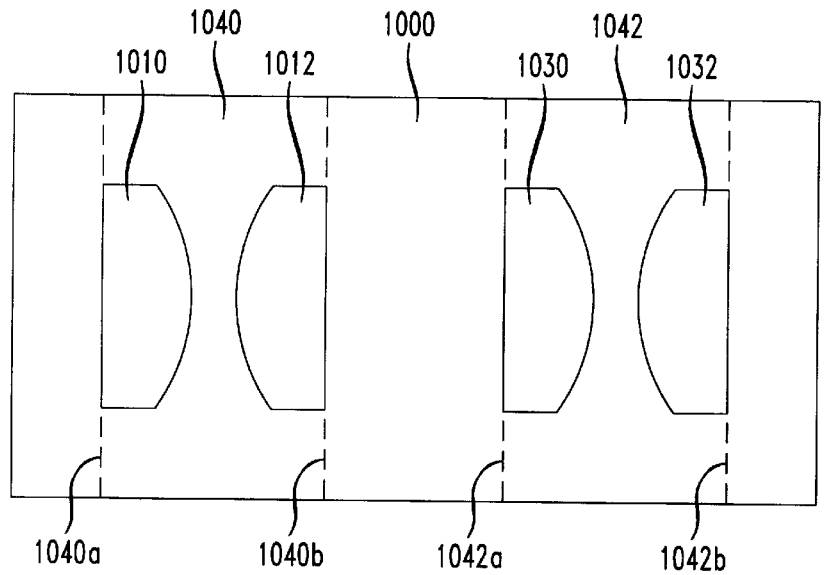
FIGS. 11A–B show a physical device for allowing the pair of lenses to slide up and down or back and forth in optional grooves.
Figure 11B:
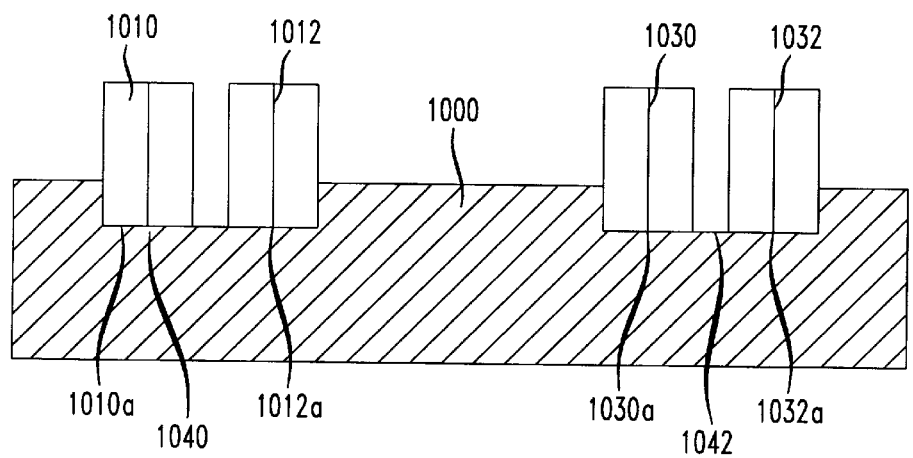

FIGS. 11A and 11B show a substrate 1000 for allowing a pair of lenses to slide up and down or back and forth. The physical device 1000 is comprised of grooves 1040 and 1042 as shown by the side view in FIG. 11B. The lenses 1010 and 1012, as well as the lenses 1030 and 1032 are located on the physical device 1000. Bottoms 1010*a* and 1012*a* are epoxied in the groove 1040 as shown in FIG. 11B. Bottoms 1030*a* and 1032*a* are epoxied in the groove 1042. The alignment is done before epoxying. One slides the lenses 1010, 1012, 1030, and 1032 to obtain alignment and then one epoxies everything in place and alignment is preferably not changed again. Other alternatives are possible.

Figure 12:
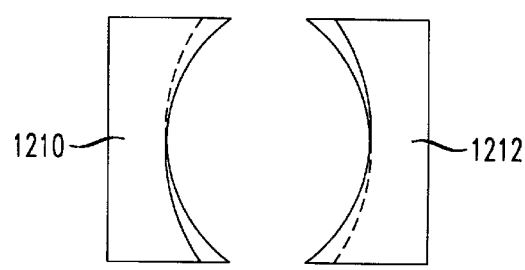
FIG. 12 shows two negative cylindrical lenses.

Although all of the examples show and discuss pairs of "positive" cylindrical lenses, one could also use pairs of "negative" cylindrical lenses with tilted axes as shown in FIG. 12. FIG. 12 shows lenses 1210 and 1212. "Negative" cylindrical lenses can be made as known in FIG. 12 or by diffusion techniques that reduce the index of refraction near the lens axis compared to far away from the lens axis.

We claim:

1. An apparatus comprised of:

a first pair of cylindrical lenses comprised of a first cylindrical lens and a second cylindrical lens, the first cylindrical lens having a first cylindrical axis and the second cylindrical lens having a second cylindrical axis and wherein the first cylindrical axis and the second cylindrical axis are substantially perpendicular to one another;

the first cylindrical lens adapted to slide up and down along a first line segment;

the second cylindrical lens adapted to slide up and down along a second line segment;

wherein the first and second line segments are approximately parallel to each other;

and wherein the first cylindrical axis and the second cylindrical axis are both not parallel to either the first or the second line segments.

2. The apparatus of claim 1 wherein:

the first and second cylindrical lenses are positive.

3. The apparatus of claim 1 wherein:

the first and second cylindrical lenses are negative.

4. The apparatus of claim 1 and further comprised of:

a second pair of cylindrical lenses comprised of a third cylindrical lens and a fourth cylindrical lens, the third cylindrical lens having a third cylindrical axis and the fourth cylindrical lens having a fourth cylindrical axis and wherein the third cylindrical axis and the fourth cylindrical axis are substantially perpendicular to one another;

the third cylindrical lens adapted to slide up and down along a third line segment;

the fourth cylindrical lens adapted to slide up and down along a fourth line segment;

wherein the third and fourth line segments are approximately parallel to each other;

and wherein the third cylindrical axis and the fourth cylindrical axis are both not parallel to either the third or the fourth line segments.

5. The apparatus of claim 4 wherein:

the first, second, third, and fourth line segments are approximately parallel to each other.

6. The apparatus of claim 1 further comprised of:

an optical source;

an optical destination;

wherein the first and second cylindrical lenses are located so that light from the optical source passes through the first cylindrical lens first, passes through the second cylindrical lens next, and thereafter reaches the optical destination.

7. The apparatus of claim 4 further comprised of:

an optical source;

an optical destination;

wherein the first, second, third, and fourth cylindrical lenses are located so that light from the optical source passes through the first cylindrical lens first, passes through the second cylindrical lens next, passes through the third cylindrical lens next, passes through the fourth cylindrical lens next, and thereafter reaches the optical destination.

8. The apparatus of claim 5 further comprised of:

an optical source;

an optical destination;

wherein the first, second, third, and fourth cylindrical lenses are located so that light from the optical source passes through the first cylindrical lens first, passes through the second cylindrical lens next, passes through the third cylindrical lens next, passes through the fourth cylindrical lens next, and thereafter reaches the optical destination.

9. The apparatus of claim 6 wherein:

the optical source is a laser.

10. The apparatus of claim 6 wherein:

the optical source is comprised of an optical fiber.

11. The apparatus of claim 6 wherein:

the optical source is comprised of an optical waveguide.

12. The apparatus of claim 6 wherein:

the optical destination is comprised of a small area detector.

13. The apparatus of claim 6 wherein:

the optical destination is comprised of an optical fiber.

14. The apparatus of claim 6 wherein:

the optical destination is comprised of an optical waveguide.

15. The apparatus of claim 1 wherein:

the first cylindrical lens has a focal length and the first and second cylindrical lenses are separated by a distance of less than one-twentieth of the focal length.

16. The apparatus of claim 1 wherein:

the first cylindrical lens is a cutout of a first original cylinder having a cylindrical axis, said first cylindrical lens being constructed by tilting the first original cylinder so that its cylindrical axis is at an angle A1 with respect to a line segment KL and cutting out a first intermediate block of the first original cylinder with:

upper and lower cuts which are substantially perpendicular to the line segment KL; and right and left cuts which are substantially parallel to the line segment KL;

the intermediate block having two contoured sides, and then cutting the first intermediate block so that one contoured side is eliminated.

17. The apparatus of claim 16 wherein:

the second cylindrical lens is a cutout of a second original cylinder having a cylindrical axis, said second cylindrical lens being constructed by tilting the second original cylinder in the opposite direction from that of the first cylindrical lens, so that its cylindrical axis is at an angle A2 with respect to a line segment MN and cutting out a second intermediate block of the second original cylinder with:

upper and lower cuts which are substantially perpendicular to the line segment MN; and right and left cuts which are substantially parallel to the line segment MN;

the second intermediate block having two contoured sides, and then cutting the second intermediate block so that one contoured side is eliminated.

18. The apparatus of claim 1 wherein the first cylindrical axis is at an angle of about forty-five degrees with respect to the first and second line segments; and the second cylindrical axis is at an angle of about forty-five degrees with respect to the first and second line segments.

19. The apparatus of claim 1 further comprised of:

a first mirror.

20. The apparatus of claim 16 further comprised of:

an optical source;

an optical destination;

wherein the first and second cylindrical lenses are located so that light from the optical source passes through the first cylindrical lens first, passes through the second cylindrical lens next, and thereafter reaches the optical destination.

21. The apparatus of claim 16 further comprised of:

a second mirror.

22. The apparatus of claim 18 further comprised of:

an optical source;

an optical destination;

wherein the first and second cylindrical lenses are located so that light from the optical source passes through the first cylindrical lens first, passes through the second cylindrical lens next, and thereafter reaches the optical destination.

23. The apparatus of claim 1 and further wherein:

the first cylindrical lens is comprised of a first region having a first material index of refraction and a second region having a second material index of refraction, wherein the first and second material indices of refraction are different.

24. The apparatus of claim 23 and further wherein:

the first material index of refraction is an average index of refraction for the first region and wherein from the center of the first region towards the outer fringes of the first region the index of refraction of the first region gradually decreases;

the second material index of refraction is an average index of refraction for the second region and wherein from the start of the second region near the first region towards the outer fringes of the second region away from the first region, the index of refraction of the second region gradually decreases.

25. The apparatus of claim 23 wherein the first region is centrally located on the first cylindrical lens and the second region is located towards an outer edge of the first cylindrical lens.

26. The apparatus of claim 23 and wherein p1 the first cylindrical lens is further comprised of:

a third region having a third material index of refraction wherein the first, second, and third material indices of refraction are different;

and wherein the third region is located towards an outer edge of the first cylindrical lens.

27. A method comprised of placing a first cylindrical lens having a first cylindrical axis in the path of light from an optical source; placing a second cylindrical lens having a second cylindrical axis in the path of light from optical source after the light has passed through the first cylindrical lens; and orienting the first cylindrical lens and the second cylindrical so that the first cylindrical axis is substantially perpendicular to the second cylindrical axis; and moving the first cylindrical lens along a first line segment wherein the first line segment is not parallel to the first and second cylindrical axis.

28. The method of claim 27 further comprised of moving the second cylindrical lens along a second line segment wherein the second line segment is not parallel to the first or second cylindrical axes.

29. The method of claim 28 wherein:

the first and second line segments are substantially parallel.

30. The method of claim 29 wherein:

the first and second line segments are at about a 45 degree angle with respect to both the first and the second cylindrical axes.

31. The method of claim 27 wherein the first cylindrical lens has a first focal length and the first and second cylindrical lenses are placed a distance of less than one-twentieth of the first focal length from each other.

32. The method of claim 30 wherein the first cylindrical lens has a first focal length and the first and second cylindrical lenses are placed a distance of less than one-twentieth of the first focal length from each other.

33. The method of claim 27 further comprised of placing a third cylindrical lens having a third cylindrical axis in the path of light from the optical source after it has passed through the second cylindrical lens;

placing a fourth cylindrical lens having a fourth cylindrical axis in the path of light from the optical source after the light has passed through the third cylindrical lens; and orienting the third cylindrical lens and the fourth cylindrical lens so that the third cylindrical axis is substantially perpendicular to the fourth cylindrical axis.

34. The method of claim 33 further comprised of moving the third cylindrical lens along a third line segment wherein the third line segment is not parallel to the third or fourth cylindrical axes.

35. The method of claim 34 further comprised of moving the fourth cylindrical lens along a fourth line segment wherein the fourth line segment is not parallel to the third or fourth cylindrical axes.

36. The method of claim 35 wherein:

the third and fourth line segments are substantially parallel.

37. The method of claim 36 wherein:

the third and fourth line segments are at about a 45 degree angle with respect to both the third and the fourth cylindrical axes.

38. The method of claim 33 wherein the third cylindrical lens has a third focal length and the third and fourth cylindrical lenses are placed a distance of less than one-twentieth of the third focal length from each other.

39. The method of claim 38 wherein the third cylindrical lens has a third focal length and the third and fourth cylindrical lenses are placed a distance of less than one-twentieth of the third focal length from each other.

* * * * *